Nov. 23, 1926.
C. MORGANA
1,607,639
VEHICLE BODY CONSTRUCTION
Filed May 24, 1926
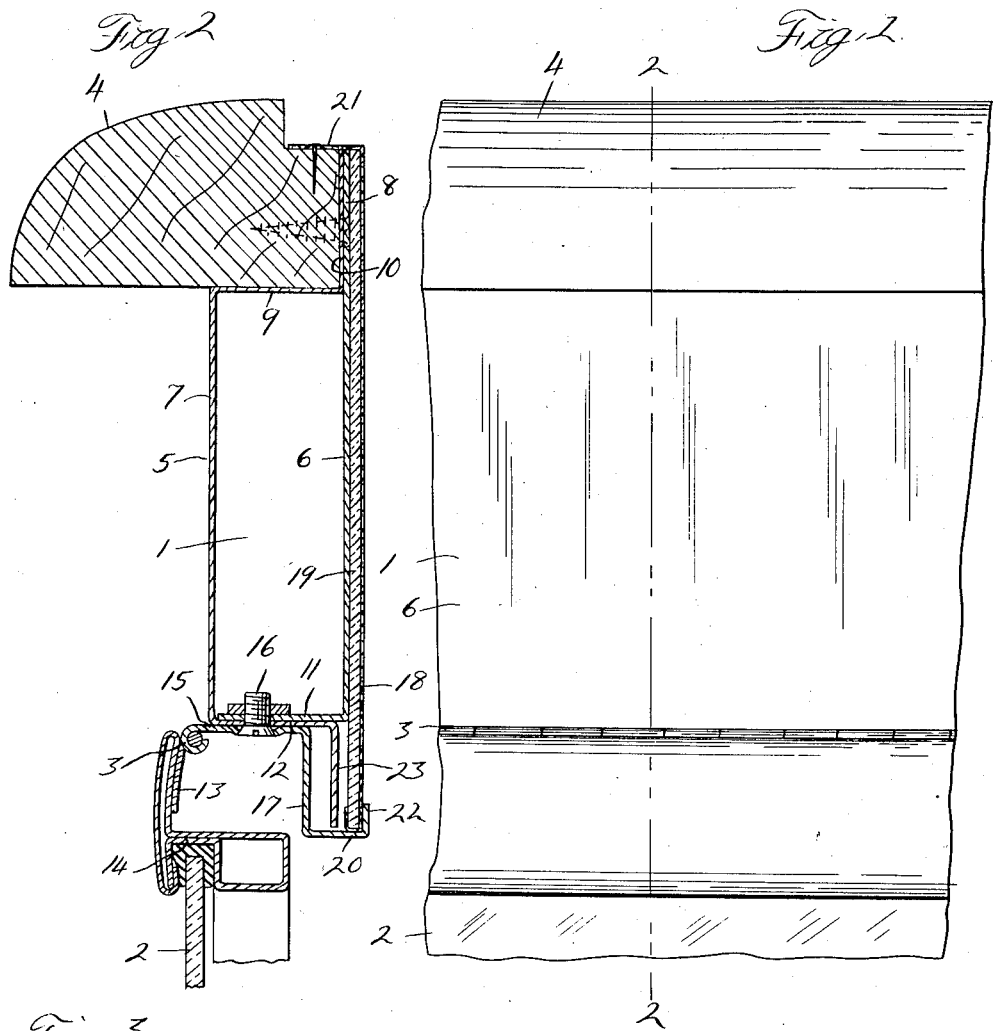
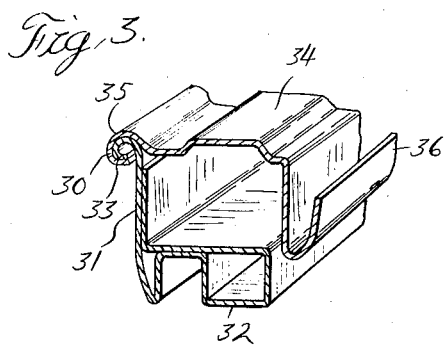
Inventor
Charles Morgana
By Whittemore Hulbert Whittemore
+Belknap
Attorneys Patented Nov. 23, 1926.

1,607,639

UNITED STATES PATENT OFFICE.

CHARLES MORGANA, OF DETROIT, MICHIGAN, ASSIGNOR TO BRIGGS MANUFACTURING COMPANY, OF DETROIT, MICHIGAN, A CORPORATION OF MICHIGAN.

VEHICLE BODY CONSTRUCTION.

Application filed May 24, 1926. Serial No. 111,409.

This invention relates generally to vehicle body constructions and consists of certain novel features of construction, combinations and arrangements of parts as will be more fully described and particularly pointed out in the appended claims.

In the accompanying drawing:

Figure 1 is a front elevation of a portion of a vehicle body showing my invention applied thereto.

Figure 2 is a fragmentary vertical sectional view taken on the line 2—2 of Figure 1.

Figure 3 is a fragmentary perspective view of a slightly modified form of construction.

Referring now to the drawing, 1 is a windshield header of a vehicle body of the closed type, 2 is a windshield of conventional form, and 3 is a hinge of the piano type supporting the windshield from said header. As shown, the header 1 is supported from the front cross member 4 of the vehicle top frame and is preferably constructed from two sheet metal stampings 5 and 6 respectively. The stamping 5 is preferably channel-shape and is arranged on one edge so that the base 7 of the channel constitutes the front wall of the header, while the stamping 6 is preferably L-shape and is arranged in upright position so that the upstanding portion 8 thereof constitutes the rear wall of the header. To provide a strong and durable box-like construction to take care of weaving and twisting actions to which this structure may be subjected, the upper wall 9 of the channel stamping 5 is provided at its rear edge with an upstanding flange 10 that is secured with the upstanding portion 8 of the L-shaped stamping to the top cross member 4, while the base 11 of the L-shaped stamping 6 is secured to the lower wall 12 of the channel stamping 5.

With the present construction, one part 13 of the hinge 3 is rigidly secured to the top rail 14 of the windshield, while the other part 15 is preferably detachably secured by means of screws 16 to the lower wall of the header and is provided at its rear edge with a depending channel-shaped portion 17 for supporting a panel 18 of fabric trimming material that constitutes the interior finish for the header. As shown, this panel 18 has a backing 19 of card board that rests upon the base 20 of the channel 17 and against the rear wall 8 of the header. Thus, with this construction, the panel 18 and its backing 19 may be quickly inserted into the channel 17 and may be secured in position by tacking an extension 21 of the fabric at the upper end of the panel to the cross frame member 4. In this connection it will be noted that the upstanding flange 22 at the rear edge of the channel 17 is in a vertical plane that is spaced from the vertical plane of the rear wall 8 of the header and that the distance between these vertical planes is substantially equal to the thickness of the fabric panel 18 and backing 19, hence the latter will fit snugly against the header when in assembled position. Preferably, the lower wall 12 of the channel stamping 5 is provided at its rear edge with a depending flange 23 that is substantially parallel to the upstanding flange 22 and surface to guide the lower edge of the panel 18 and backing 19 into the channel 17. This flange 23 also stiffens and reinforces the header construction.

In Figure 3 I have shown a slight modification in which a pintleless hinge 30 is used to connect the windshield to the header. As shown the hinge part 31 constitutes an upstanding extension of the top rail 32 of the windshield and terminates in the rolled portion 33 while the hinge part 34 is provided at its forward edge with the hooked portion 35 that embraces the rolled portion 33 and is provided at its rear edge with the upwardly opening channel portion 36 which corresponds with the channel portion 20 and is adapted to receive the panel of trimming material in the same manner.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. The combination with a windshield header, and a panel of trimming material constituting a finish for said header, of a windshield hinge secured to said header and having a portion supporting said panel of trimming material.

2. The combination with a windshield header, and a panel of trimming material constituting a finish for said header, of a windshield hinge carried by said header and having a channel-shaped portion receiving an edge portion of said panel of trimming material.

3. The combination with a top frame member, and a windshield header carried thereby, of a windshield hinge having a part secured to said header, and a panel of trimming material supported upon said hinge part and secured to said frame member.

4. The combination with a windshield header having an upright wall, of a windshield hinge carried by the lower wall of said header and having a depending channel-shaped portion, and a panel of trimming material resting in said channel-shaped portion and constituting a finish for the upright wall aforesaid of said header.

5. The combination with a windshield header having an upright wall, of a windshield hinge carried by said header and having a channel-shaped portion, a panel of trimming material resting in said channel-shaped portion and constituting a finish for the upright wall of said header, and a flange projecting from said header in substantial parallel relation to a side wall of said channel-shaped portion so that said flange can direct said panel of trimming material into said channel portion when the said panel is applied to said header.

6. The combination with a top frame member, of a windshield header supported from said member and comprising two sections, one section being channel-shape and arranged on one edge so that the base of the channel constitutes one wall of the header, the other section being L-shape and arranged in upright position so that the upstanding portion of the L constitutes another wall of said header.

7. The combination with a top frame member, of a windshield header supported from said member, and comprising two sections, one section being channel-shape, and the other section being L-shaped, the base of said L-shaped section being secured to one side wall of said channel section, and the other side wall of said channel section having a flange secured with the upstanding portion of the L-shaped section to said frame member.

In testimony whereof I affix my signature.

CHARLES MORGANA.